J. DAVIES & F. J. MORGAN.
SHACKLE FOR USE IN COUPLING VEHICLES.
APPLICATION FILED SEPT. 27, 1915.
1,184,429.
Patented May 23, 1916.
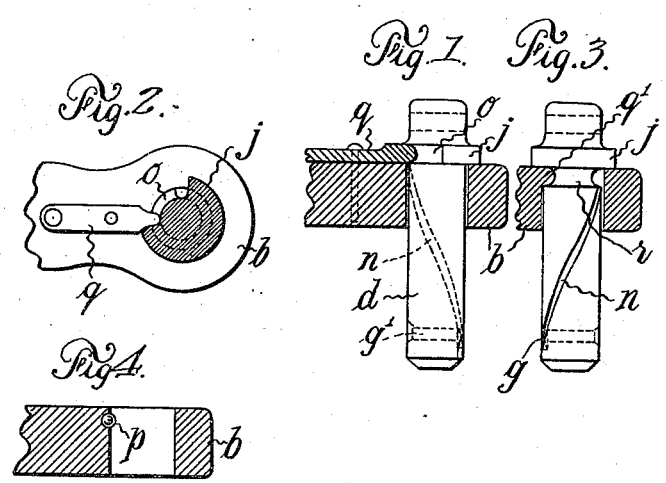

UNITED STATES PATENT OFFICE.

JOHN DAVIES, OF MERTHYR TYDFIL, AND FREDERICK JOHN MORGAN, OF UPLANDS, SWANSEA, WALES.

SHACKLE FOR USE IN COUPLING VEHICLES.

1,184,429.  Specification of Letters Patent.  Patented May 23, 1916.

Application filed September 27, 1915. Serial No. 52,931.

*To all whom it may concern:*

Be it known that we, JOHN DAVIES and FREDERICK JOHN MORGAN, subjects of the King of Great Britain, residing at 46 Nantygwenith street, Merthyr Tydfil, and 3 The Grove, Uplands, Swansea, both in Wales, Great Britain, have invented Improvements in or Relating to Shackles for Use in Coupling Vehicles; and we do hereby declare the following to be a full, clear, and exact description of the invention, such as will enable others skilled in the art to which it appertains to make and use the same.

This invention relates to shackles for use in connecting vehicles and is more specially intended for use with colliery pit corves or tubs, the object being the provision of means whereby the shackle-pin when placed in position for coupling one vehicle to another, is firmly locked therein so as to effectually prevent displacement through vibration or other disturbing causes.

With this object in view the present invention consists broadly in forming or attaching a pin or projecting member on the shackle adapted to engage in a longitudinally extending groove formed within the shackle-pin and means whereby a partial turn takes place instantaneously with the positioning of the pin.

In order that this invention may be readily understood, we will now proceed to describe the same with reference to the accompanying drawings in which:—

Figure 1 is a fragmentary side view, partly in section, of a shackle and shackle-pin showing our invention; Fig. 2, a plan view of Fig. 1 partly in section; Fig. 3, a view similar to Fig. 1 showing a modified form of the invention; and Fig. 4, a fragmentary view showing another modified construction.

Referring to the drawings, $a$ is the body of the shackle formed with the usual top and bottom jaws $b$ having therein concentrically arranged holes $c$ wherein is adapted to be inserted a pin $d$.

The pin $d$ is formed with a longitudinally extending spiral groove $n$ which in the example has its inception within a cut-away portion $o$ in the collar $j$. This latter portion $o$ as will be best seen from Fig. 2 extends around the collar $j$ for a distance equal to a quarter of the circumference thereof and is intended to be engaged by a locking pin or member $q$ which latter is riveted or otherwise secured to the upper surface of the top jaw $b$. This construction allows of the pin $d$ being moved from the unlocked position existing when the inception of the groove $n$ coincides with the locking pin $q$.

It will thus be seen that by employing a spiral groove the operation of shackling and locking are transformed into one operation. Furthermore, when the pin is allowed to drop of its own weight the inertia due to the spiral motion imparted is sufficient to carry the inception of the groove beyond the locking pin $q$ into, approximately, the locked position.

In Figs. 3 and 4 are shown two modified forms of locking pins, the construction according to Fig. 3 consisting of a small projecting piece $q'$ secured in position within the hole $c$ of the upper jaw $b$, and adapted to engage within a circumferential groove $r$ which may extend completely around the body of the pin $d$ or only partially thereof. The construction shown in Fig. 4 is a modification of that shown in Fig. 3 the difference being that of a steel or other hard sphere $p$ is employed in lieu of the member $q'$.

What we do claim as our invention and desire to secure by Letters Patent, is:—

A shackle having a pin arranged to slide endwise and provided with a longitudinally extending spiral groove and a circumferential groove communicating with the spiral groove, and a holding projection on the shackle fitting in the groove.

In testimony whereof we have signed our names to this specification in the presence of two subscribing witnesses.

JOHN DAVIES.
FREDERICK JOHN MORGAN.

Witnesses:
G. H. BAYNHAM,
GILBERT ULEC.

Copies of this patent may be obtained for five cents each, by addressing the "Commissioner of Patents, Washington, D. C."